C. F. HESS.
AUTOMOBILE ENGINE EXHAUST DEFLECTOR.
APPLICATION FILED JAN. 19, 1916.
1,173,801.
Patented Feb. 29, 1916.
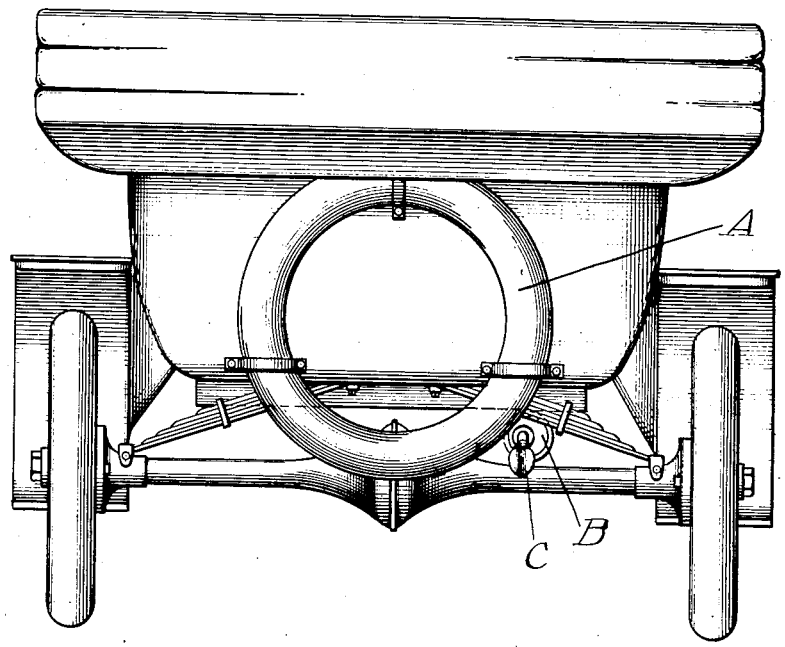
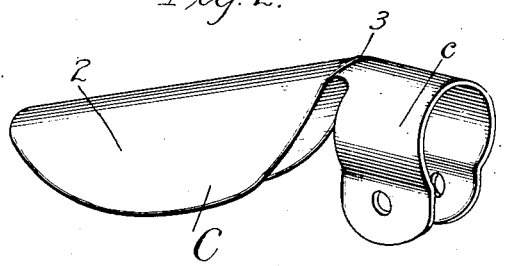
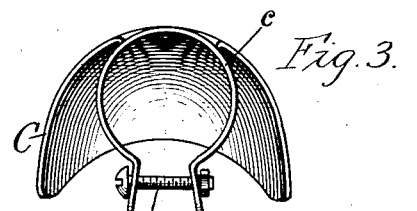
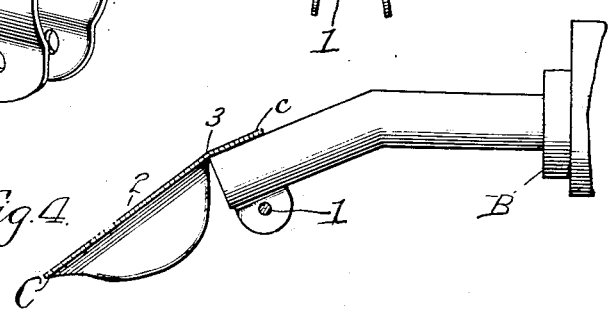
Witnesses:
Arthur W. Carlson
Erwin C. Lange
Inventor:
Christian F. Hess
by Arthur F. Durand
atty.

UNITED STATES PATENT OFFICE.

CHRISTIAN F. HESS, OF CHICAGO, ILLINOIS, ASSIGNOR TO ALEXANDER NELSON, OF CHICAGO, ILLINOIS.

AUTOMOBILE-ENGINE-EXHAUST DEFLECTOR.

1,173,801. Specification of Letters Patent. Patented Feb. 29, 1916.

Application filed January 19, 1916. Serial No. 72,969.

*To all whom it may concern:*

Be it known that I, CHRISTIAN F. HESS, a citizen of the United States of America, and resident of Chicago, Cook county, Illinois, have invented a certain new and useful Improvement in Automobile-Engine-Exhaust Deflectors, of which the following is a specification.

My invention relates to devices for deflecting the discharge from the exhaust of an automobile engine to prevent the hot gases from injuring some portion of the automobile.

My invention contemplates, therefore, a device which can be readily attached to the exhaust pipe of an automobile engine and which can be adjusted into position to prevent the exhaust from injuring the extra tire usually carried on the rear end of the machine.

To this and other useful ends, my invention consists in matters hereinafter set forth and claimed.

In the accompanying drawings—Figure 1 is a rear elevation of an automobile, showing the exhaust pipe thereof provided with a deflector embodying the principles of my invention. Fig. 2 is a perspective of the said deflector. Fig. 3 is an end elevation of the said deflector. Fig. 4 is a side elevation of the engine exhaust pipe, showing the deflector in section.

As thus illustrated, and referring to Fig. 1, an extra tire A is usually carried on the rear of the automobile, and the construction of the engine and the exhaust thereof are very often such that the hot gases injure the said tire. As shown, the exhaust muffler B is, it will be seen, so arranged that the exhaust is discharged rearward beneath the body of the automobile, and very nearly in line with one side of the said tire. In order to keep the exhaust away from the said tire, and at the same time not interfere with the free discharge of the exhaust, a deflector C is attached to the end of the exhaust pipe. This deflector comprises a resilient portion $c$ which has the form and mode of operation of a split collar, this portion being adjustably clamped on the end of the exhaust pipe by a tightening of the bolt 1 which connects the two lower end portions of the said collar together. The body portion 2 of the said deflector is connected by a neck portion 3 with the top of the said collar. This body portion 2 is of greater width than said collar, is trough-shaped in cross-section, and is tilted downward by the bending of the neck portion 3, whereby the exhaust is deflected downward by the hollow or concave under side of the said body portion. By curving the portion 2 in the manner shown and described, the discharge from the exhaust pipe is prevented from spreading too much laterally, which might injure the tires on the rear wheels of the vehicle, and at the same time the exhaust is kept away from the tire A, so that the latter is in no danger of deterioration while not in use. The said deflector is preferably constructed from sheet metal of suitable character, such as steel which will not be injured by the heat of the exhaust, and which will provide a resilient collar $c$ in the manner explained. The air circulates freely around the narrow neck portion 3 so that this portion does not become overheated, and the angle and shape of the portion 2 are such that the exhaust is deflected in the desired manner without in any way restricting or throttling the exhaust or causing any appreciable back pressure in the exhaust passage extending from the engine.

I do not, of course, limit myself to the exact construction shown and described.

What I claim as my invention is:—

In combination with an automobile having the exhaust pipe of the engine arranged underneath the body and directed rearward thereof, a guard secured on the rear end of said pipe to deflect the exhaust downward and away from the rear of the automobile, said guard consisting of a single piece of sheet metal providing a resilient split collar which receives the end of said pipe, a body section curved in cross section to form a channel on the under side thereof and disposed in position for deflecting the exhaust, a neck portion integrally uniting said collar and body section, and a screw to contract said collar on the pipe, permitting rotation of the guard on the pipe to any desired position thereof, substantially as and for the purpose set forth.

Signed by me at Chicago, Illinois, this 29th day of December 1915.

CHRISTIAN F. HESS.